June 2, 1925.  J. PARIS  1,539,909
EDUCATIONAL DEVICE
Filed March 1, 1923    2 Sheets-Sheet 1
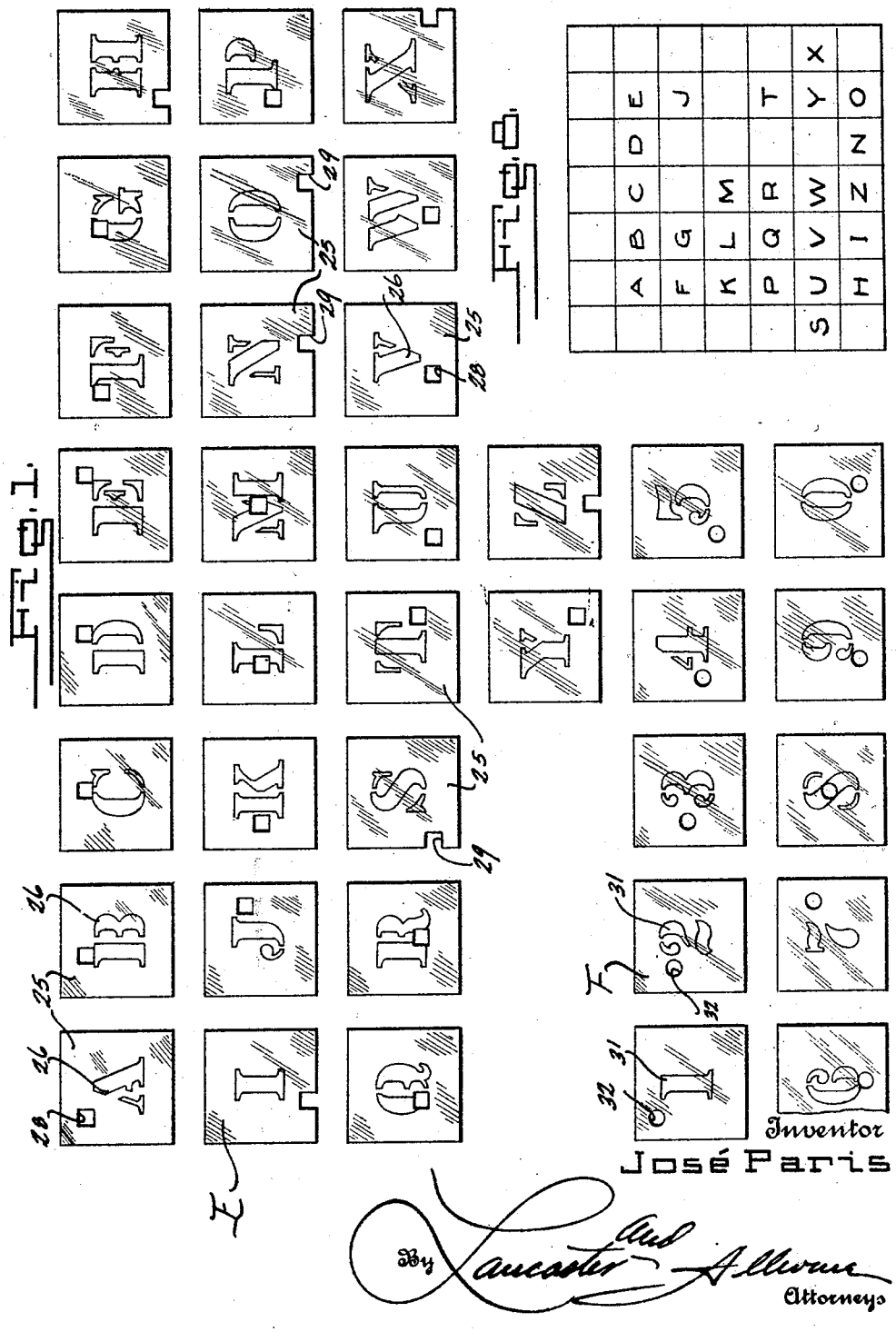
Inventor
José Paris

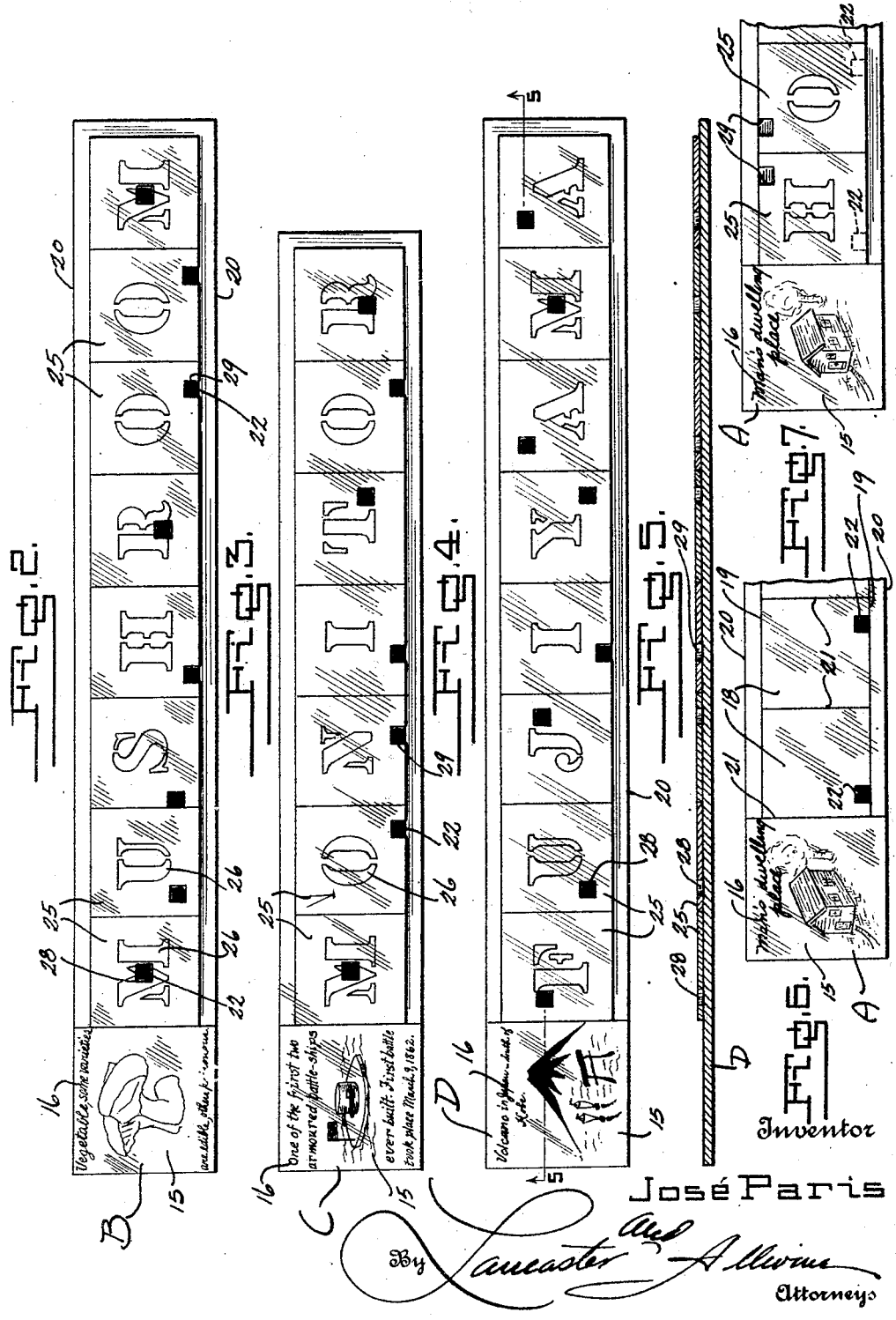

Patented June 2, 1925.

1,539,909

UNITED STATES PATENT OFFICE.

JOSÉ PARIS, OF MANILA, PHILIPPINE ISLANDS.

EDUCATIONAL DEVICE.

Application filed March 1, 1923. Serial No. 622,131.

*To all whom it may concern:*

Be it known that I, José Paris, a citizen of the United States, residing at Manila, Philippine Islands, have invented certain new and useful Improvements in an Educational Device, of which the following is a specification.

This invention relates to improvements in educational devices.

The primary object of this invention is the provision of an educational device, in the nature of a puzzle, embodying a base member having certain characters fixed thereon, and a plurality of playing members for association in a determined relation upon the base member, whereby a correct solution or result may be obtained, without liability of error.

A further object of this invention is the provision of an improved educational device, which may be used in connection with the solving of problems relating to many fields of human endeavor, study, and the like, such as art, history, spelling, geography, natural history, physics, botany, mathematics, and the like.

A further object of this invention is the provision of an educational device which embodies a base member having certain spaces therein and matter illustrative of a problem to be solved, and also embodying playing members for cooperation in the spaces of the base member, in a determined relation, for presenting a solution of the problem to which the illustrative matter on the base refers.

Other objects and advantages of this invention will be apparent during the course of the following detailed description.

In the accompanying drawings, forming a part of this specification, and wherein similar reference characters designate corresponding parts throughout the several views, Figure 1 is a plan view of sets of playing members which may be embodied in the educational device.

Figs. 2, 3 and 4 are examples of the relation which the improved details of the educational device bear to each other, more particularly showing the correct positioning of certain playing members on a base.

Fig. 5 is a cross sectional view taken longitudinally of the details illustrated in Figure 4, on the line 5—5 of said figure, Fig. 6 is a fragmentary plan view of a base member embodied as a part of the educational device.

Fig. 7 is a plan view of the base member illustrated in Figure 6, showing the inaccurate positioning of playing members thereon, and the manner in which such inaccuracy is apparent.

Fig. 8 is a diagrammatic representation of the manner in which a set of playing members are relatively marked.

In the drawings, wherein for the purpose of illustration is shown but the preferred embodiment of this invention, the letters A, B, C and D designate base members representative of different solutions, by way of example, adapted to receive the playing members of a set E. A second set of playing members F may likewise be provided in connection with the solving of various problems.

Referring to the base members A, B, C and D, the structural features thereof are identical, and it is preferred that the same be of some durable material, such as card board, wood, metal, celluloid, or the like, preferably flat and rectangular in plan view, providing upon one end of the upper surface thereof a space 15 within which an illustration is provided, referable to some matter to be spelled or solved, and likewise having therein explanatory matter 16 pertinent to the illustration in the space 15. Thus, the base member A has a house in the space 15, and explanatory matter 16 therein pertinent to the house, and as a guide in the spelling of a word. The remaining upper surface of the playing member A is subdivided into square spaces 18 of equal dimension, which are provided by scribing the horizontal lines 19 longitudinally of the base A, on the upper surface thereof, and parallel with, and just inwardly of the longitudinal marginal edges 20. Vertical lines 21 subdivide the base member A intermediate the parallel lines 19 into the proper squares 18. In each square a delineation 22 is provided, preferably of ink or some wearing substance or material which lies flush with the surface of the space 18. These delineations 22 are preferably black, or of some very contrasting color with the remainder of the spaces 18.

The base member B has an illustration therein pertinent to vegetation, while the illustration of the base members C and D are respectively historical and geographical in significance.

In connection with each complete educational device, sets of playing members E and F are provided. The set E preferably comprises a plurality of the playing blocks 25, each of which contain a different letter 26 of the alphabet. These playing members 25 are of the same size, and preferably of some durable material, preferably flat and square in plan. The upper surfaces of the same, of course, are the only surfaces which contain the alphabetical characters or letters 26. As an aid in the correct solution of a problem to be solved or a word to be spelled, the blocks or playing members 25 are apertured or recessed, in dissimilar manner, to cooperate with the delineations 22, as will be hereinafter more fully described. To this end, all of the letters of the alphabet, with the exception of letters H-I-N-O-S-X and Z are provided with the square apertures 28 transversely therethrough, while the latter specifically mentioned letters are provided with recesses, 29, of polygonal formation, extending inwardly from a lower or side marginal edge of the same. The reason for providing the apertures and recesses in the letters in such manner, is evident from the diagrammatic illustration in Figure 8, which diagrammatically represents the manner in which the set of blocks E are relatively apertured and recessed in the most efficient manner, so as to eliminate the liability of confusing the blocks during the playing thereof, and as will be more apparent during a description of the cooperation of the playing members on the base.

The set of playing members F are of analogous formation with the playing members 25, and preferably have numerals 31 thereon; ten of such playing members being provided, as is illustrated in the drawings. In contradistinction to the square apertures 28 of the playing members 25, the playing members of the set F are provided with circular apertures 32, to readily distinguish the same.

The playing of the improved educational device, to produce a result, either spelling a word, or solving a problem is at once apparent. For spelling, the pupil or person reading the descriptive matter 16 on a base member B and observing the illustration thereon will at once conclude that the word "Mushroom" is the word to be spelled. The pupil or person, of course, spells the word and to determine the correctness thereof the playing members 25, or rather the correct playing members 25 of the set E are arranged on the playing member B, so that each playing member 25 is disposed exactly within a space 18 bounded by the lines 19 and 21. If the aperture or recess aligns with the delineations 22 in the space 18, the playing member positioned in such space is correct, and the delineation 22 will be visible, as is indicated in Figures 2, 3 and 4. In this manner the word is spelled and the correctness thereof ascertained by means of the improved educational device.

It is to be noted that in the case of the letters H, I, N, O, S, X and Z, the same may be read either in true upright position, or an inverted position. To obviate liability of error, the diagrammatic view of Figure 8 shows the recesses 29 provided in the playing members bearing these particular letters, and in such relation to the relative positioning of apertures of the remaining blocks, that when these particular blocks are inverted, their recesses will not fall on any delineations provided in any base member provided in connection with the set of letters E. In other words, each block or playing member is apertured or recessed according to the proportionate position occupied by the space in Figure 8, which bears the same letter as the block. It is thus obvious from Figure 8, that the apertures 28 of the playing members 25 will in no wise ever be mistakenly positioned on a delineation reserved for a recess 29 of the playing members 25, either in the true or inverted position of those playing members having recesses 29.

As is illustrated in Figure 7 certain playing members 25 have been shown in improper inverted positions, it being obvious that an error has been made by reason of the fact that the recesses 29 do not expose the delineations 22 in the space upon which they are positioned.

From the foregoing description of this invention it is obvious that an educational device has been provided, which is very simple in construction, involving parts which may be economically manufactured. The novel cooperation of the recesses or apertures in the playing members, in their aligning relation with the delineations 22, facilitates the assemblage of the playing members upon a base member. In view of the flush relation of the delineations 22 in their spaces 18, there are no projecting parts on either the base member or playing members, which will become mutilated or broken, as is the case in many educational devices partaking of the nature of this invention.

Various changes in the shape, size, arrangement of parts, and application of the principle of this invention to various fields of endeavor may be made to the forms of the invention herein shown and described, without departing from the spirit of the invention or the scope of the claims.

I claim:

1. As an article of manufacture a base member for educational devices of elongated formation providing an illustration with explanatory matter on the upper surface thereof adjacent one end of the same, said base member on said upper surface from said illustration to the opposite end thereof having longitudinal lines scribed thereon in parallel relation inwardly of the longitudinal edges of said base member and vertical lines intermediate said longitudinal lines at right angles to the latter subdividing said base member into a plurality of squares of equal dimension, each of said squares having a contrasting delineation therein, and marked blocks for fitting upon said squares having cutouts for exposing said delineations when the blocks are placed upon the proper squares.

2. A device of the class described comprising a set of playing members having different characteristics thereon and provided with dissimilarly positioned cutouts formed therein, certain of said members having characters thereon readable when the members are in inverted relation, such members having the cutouts leading from the marginal edges and dissimilarly positioned with respect to the cutouts of the remaining members either when in true or inverted position.

3. An educational device comprising a base provided with spaces thereon having delineations substantially flush with the surface of each of said spaces, and playing members having characters thereon adapted to be arranged in a determined relation in the spaces on said base and having openings therein for exposing said delineations when said playing members are positioned in correct relation upon the base.

4. An educational device comprising a base provided with spaces thereon having delineations substantially flush with the surface of each of said spaces, and playing members having characters thereon adapted to be arranged in a determined relation in the spaces on said base and having openings therein for exposing said delineations when said playing members are positioned in correct relation upon the base, the openings of playing members which have unlike characters thereon being dissimilarly positioned.

5. An educational device comprising a base providing a plurality of spaces thereon of substantially the same size, each of said spaces having a contrasting delineation therein flush with the surface of said space, and a set of playing blocks bearing characters thereon certain of said blocks being provided with apertures therethrough, the remaining playing blocks having characters readable when inverted, such playing blocks having recesses leading from their marginal edges and dissimilarly positioned with respect to the openings of the remaining blocks either when in their true or inverted positions.

6. An educational device comprising a base member provided with an illustration thereon and explanatory matter referable to said illustration, said base having a plurality of spaces arranged longitudinally adjacent said illustration, each of said spaces having a contrasting delineation therein, and playing members having characters thereon, each of said members having an opening therein, whereby said playing members may be disposed in the spaces on said base so that the openings of certain of said playing members will expose the delineations in said spaces to effect an arrangement of said playing members which will produce a result referabl to said illustration.

JOSÉ PARIS.